United States Patent
Sherrington

(10) Patent No.: US 7,552,799 B2
(45) Date of Patent: Jun. 30, 2009

(54) LUBRICATION CONTROL SYSTEM

(75) Inventor: Ian Sherrington, Preston (GB)

(73) Assignee: University of Central Lancashire, Lancashire (GB)

( * ) Notice: Subject to any disclaimer, the term of this patent is extended or adjusted under 35 U.S.C. 154(b) by 662 days.

(21) Appl. No.: 10/168,619

(22) PCT Filed: Dec. 21, 2000

(86) PCT No.: PCT/GB00/04920

§ 371 (c)(1),
(2), (4) Date: Sep. 16, 2002

(87) PCT Pub. No.: WO01/48357

PCT Pub. Date: Jul. 5, 2001

(65) Prior Publication Data

US 2003/0047386 A1    Mar. 13, 2003

(30) Foreign Application Priority Data

Dec. 24, 1999   (GB) ................................ 9930842.1

(51) Int. Cl.
*F16N 27/00*    (2006.01)
(52) U.S. Cl. .......................... 184/7.4; 184/24; 324/699
(58) Field of Classification Search ............... 184/6.1, 184/6.4, 7.4, 24; 73/53.05; 324/598, 699
See application file for complete search history.

(56) References Cited

U.S. PATENT DOCUMENTS

| 4,167,172 A | 9/1979 | Bassoli et al. |
| 4,326,603 A | 4/1982 | Darrow et al. |
| 4,376,389 A | 3/1983 | Inoue et al. |

(Continued)

FOREIGN PATENT DOCUMENTS

CH            613495 A       9/1979

(Continued)

OTHER PUBLICATIONS

Wing et al., "Oil Film Temperature And Thickness Measurements On The Piston Rings Of A Diesel Engine," Proc. Instn. Mech. Engrs., vol. 186:1-9, (1972).

(Continued)

*Primary Examiner*—David M Fenstermacher
(74) *Attorney, Agent, or Firm*—Venable LLP; Michael A. Sartori; Steven J. Schwarz

(57) ABSTRACT

FIG. 2 shows a cross-section through a piston 10 and cylinder wall 12 of an internal combustion engine. A piston ring 14 is located within a ring groove 16 and the piston 10. The piston ring 14 is part of an oil film thickness measurement section 18, the other parts of which comprise a displacement transducer 20 and an electrical signal conditioning unit 22. The oil supply control system also includes a control system section 24, which comprises an on line calibration section 26, an oil injection system 28 and a controller 30. Also, a user interface 38 and a secondary signal conditioning unit 40 receiving secondary signal measurements from unit 42 or several units 42 are included.

4 Claims, 2 Drawing Sheets

U.S. PATENT DOCUMENTS

Figure 1:
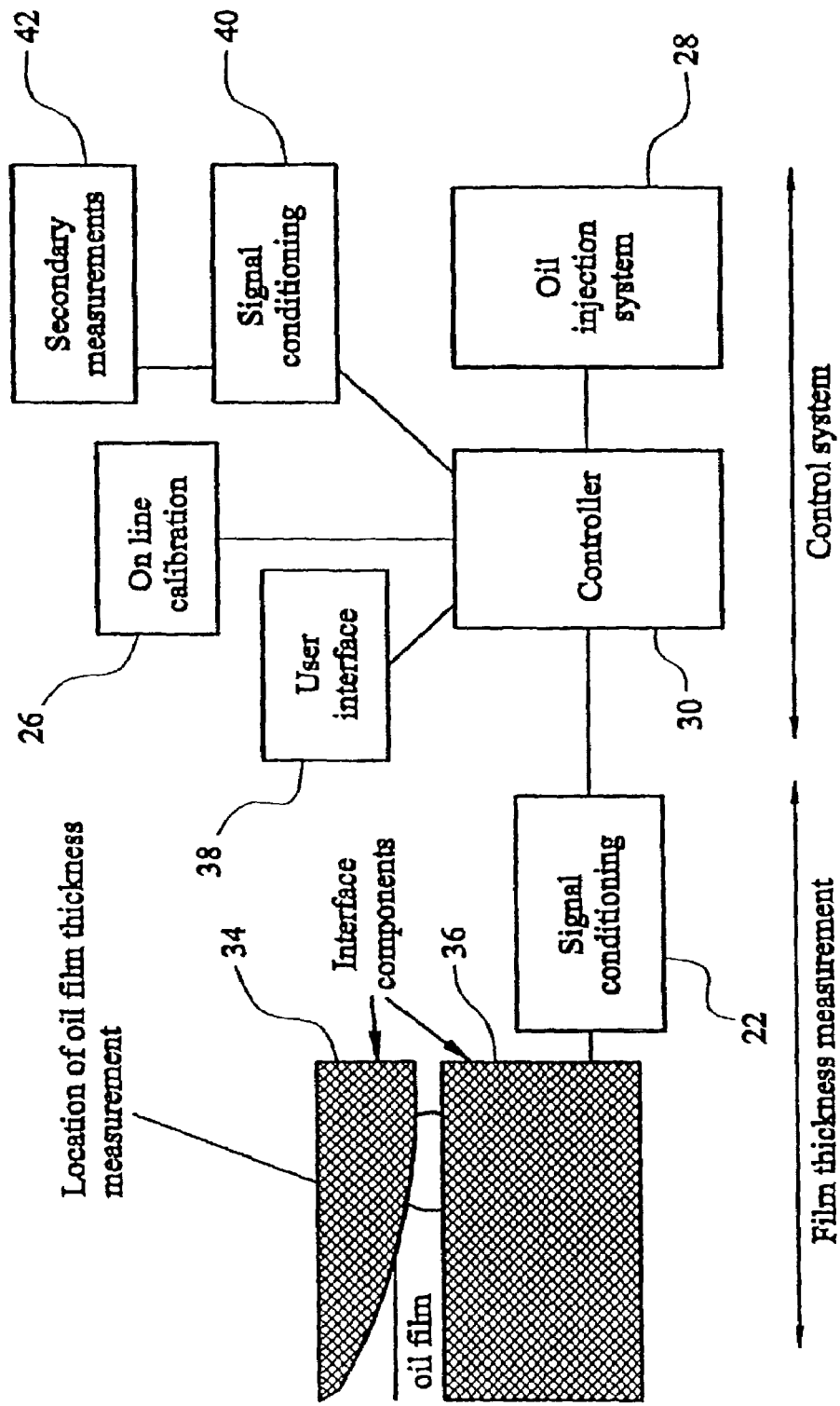

| | | | |
|---|---|---|---|
| 4,406,169 A | | 9/1983 | Ikeuchi et al. |
| 4,511,837 A | | 4/1985 | Vermeiren et al. |
| 4,572,120 A | * | 2/1986 | Matsumoto ............. 123/196 S |
| 4,632,223 A | | 12/1986 | Maurer et al. |
| 4,728,943 A | | 3/1988 | Vermeiren |
| 4,956,558 A | | 9/1990 | Batishko et al. |
| 4,978,850 A | * | 12/1990 | Nakamura et al. ..... 250/227.11 |
| 5,020,636 A | * | 6/1991 | Daeges ...................... 184/6.26 |
| 5,060,760 A | * | 10/1991 | Long et al. ................... 184/6.4 |
| 5,080,195 A | * | 1/1992 | Mizumoto et al. .......... 184/6.4 |
| 5,180,980 A | | 1/1993 | Blond et al. |
| 5,238,085 A | * | 8/1993 | Engelmann ................. 184/1.5 |
| 5,964,318 A | * | 10/1999 | Boyle et al. ................. 184/1.5 |
| 5,968,371 A | * | 10/1999 | Verdegan et al. ............ 210/739 |
| 6,477,885 B1 | * | 11/2002 | Sekine et al. .................. 73/10 |

FOREIGN PATENT DOCUMENTS

| | | | |
|---|---|---|---|
| DE | 2639839 A | | 3/1978 |
| DE | 4228988 A1 | * | 3/1994 |
| EP | 0021524 A | | 1/1981 |
| EP | 0159742 | | 10/1985 |
| EP | 0288941 A | | 11/1988 |
| EP | 0392598 | | 10/1990 |
| JP | 01-176897 | | 7/1989 |
| WO | WO 8403751 A | | 9/1984 |

OTHER PUBLICATIONS

Grice et al., "A Capacitance Based System For High Resolution Measurement Of Lubricant Film Thicknesses," Proc. of Nordtrib '90, 4th Nordic symposium on Tribology, Lubrication, Friction, and Wear, pp. 349-361, (1990).

Dow et al., "Technique For Experimental Evaluation of Piston Ring—Cylinder Film Thickness," Journal of Lubrication Technology, vol. 105:353-360, (1983).

Furuhama et al., "A Dynamic Theory Of Piston-Ring Lubrication," Bull. JSME vol. 4(16):744-752, (1961).

Wakuri et al., "Oil Film Behaviour Of A Circular Faced Slider In The Reciprocating Motion," Bull. JSME, vol. 22(167):755-762, (1979).

Inagaki et al., "Development of Two-Dimensional Oil Film Thickness Distribution Measuring System," Society of Automotive Engineers, Inc., pp. 59-67, (1995).

Sanda et al., "Development of Scanning Laser-Induced-Flourescence Method For Analyzing Piston Oil Film Behaviour," Pub 1. Mech. E. Paper 465/014/93, pp. 155-164, (1993).

S.K. Roy Chowdhury, "A feed back control system for plain bearings using film thickness measurement", Tribology International, 2000, pp. 29-37, vol. 33, Indian Institute of Technology, Kharagpur, India, Jan. 2000.

United Kingdom Search Report from GB 9930842.1, Mar. 2000.

J.S. Courtney-Pratt et al., "An Analysis of the Lubrication between the Piston Rings and Cylinder Wall of a Running Engine", Proc. I. Mech. E., 155, 1946 pp. 293-299.

* cited by examiner

LUBRICATION CONTROL SYSTEM

This invention relates to apparatus for controlling the supply of lubricant to sliding or rolling contacts between engineering components. The method can be applied to a wide range of component interfaces and is especially valuable for components which operate in the hydrodynamic and hydrostatic regimes. The system may also have value for components operating in boundary, mixed and elastohydrodynamic (EHD) regimes. The advantages of its use to lubricate some standard contacts which operate in these regimes is discussed below.

In addition, but not exclusively, the invention relates to apparatus for controlling the supply of lubricant to the piston and piston-rings in an internal combustion engine and to a method of controlling the amount of lubricant supplied to a piston and piston-rings in an internal combustion engine.

Bearings and seals commonly operate by forming a thin film of pressurised lubricant (liquid or gas) which separates the two surfaces of the interface components by a small distance, typically a few micrometres. Most commonly, contacts are lubricated by "hydrodynamic lubrication" in which pressurisation of the oil film results when components with a convergent interface geometry slide (or roll) over a deposit of lubricant on their surface. Contacts of this type require a supply of lubricant to the interface, this may be actively pumped, splashed or sprayed onto the contact. Alternatively, it may rest passively on one or both of the sliding/rolling components of the contact. By modifying the quantity of oil available to the contact, aspects of its operation can be influenced. (Note; in cases where the relative velocity between the surfaces of the two components is too low to generate a film pressure large enough to separate the two component surfaces, the contact may be pressurised by external means. This is called "hydrostatic lubrication").

There are at least three general areas in which the invention described in this document can be of value in controlling the operation of fluid film lubricated contacts.
(1) Commonly, lubricant is supplied to engineering contacts at a rate determined during the design stage on the basis of the specification of the most rigorous operating conditions for a given component. As a consequence, components operating in conditions where the load and speed may vary, are often working below their design limit and may be over-supplied with oil.
(2) Contacts which are supplied with oil in a manner which fills the oil inlet are described as being "fully flooded". A fully flooded inlet is not necessarily an essential requirement for the satisfactory operation of a fluid film contact. Many machine contacts do not have a fully flooded inlet and still work very effectively. Contacts of this type are said to have a "starved" oil inlet. Controlling the level of starvation at an inlet allows a degree of moderation to be applied to some aspects of the operating characteristics of the contact (E.g. frictional power loss, start up wear, response to dynamic loading, etc.)
(3) Operators of machinery which employs fluid film contacts generally have no means to automatically adjust the quantity or type of lubricant used to meet specific (possibly dynamically changing) requirements while using the device. Additionally, they are also not normally able to reliably monitor the effect of any change on the operation of the equipment. (E.g. a typical change may involve changing the type of oil used to lubricate the components to meet environmental requirements.)

The invention described in this patent is intended to allow operators a wide range of flexibility in selecting the way that system components may be lubricated in a range of plant, machines and engines while providing the means to monitor their operation.

Large scale stationary engines and marine diesel engines frequently incorporate an arrangement in which lubricating oil is sprayed directly onto a cylinder liner wall by quills in order to lubricate a piston skirt and rings. Typically, oil is supplied at a rate of between 0.8 g per kilowatt hour (a low rate) to 1.6 g per kilowatt hour (a high rate) depending on the power output of the engine. Engines in this field typically have capacities approaching 100,000 kilowatts. Ships, such as oil tankers, often spend 7,000 hours or more per year at sea, so the annual consumption of lubricating oil is in the region of hundreds of tonnes per year. This consumption of lubricating oil is in addition to the consumption of the fuel oil which powers the engines. Consequently, the consumption of lubricating oil represents a considerable financial burden on those who operate ships of this type. Furthermore, storage of the lubricating oil displaces space on board the ship that could be used for cargo. Also, the burning of excessive quantities of oil poses environmental issues for engine manufacturers and fleet operators.

At present, the rate of oil supply to the piston-rings, piston-skirt and cylinder liner in larger engines is generally determined on heuristic guide lines and controlled by a system which monitors the load on the engine.

Disadvantages arise with this type of system, because many factors, other than engine load, influence the amount of oil which should be supplied to the liner to optimise lubrication conditions.

It is an object of the present invention to address the above mentioned disadvantage.

According to one aspect of the present invention a lubrication control system for a system of engineering components comprises lubricant film thickness measurement means, lubricant input means and control means, wherein the control means is operable to receive signals relating to the thickness of lubricant on an element of the system from the lubricant film thickness measurement means and is operable to control the lubricant input means to adjust a supply of lubricant to one or more components of the system based on said signals from the thickness measurement means.

The lubrication control system may include calibration means, which may be operable to determine the value of at least one physical variable of the lubricant. The calibration means may supply said value(s) to the control means. The physical variable(s) may be one or more of viscosity, dielectric constant, electrical resistance, or optical constants (or other appropriate variables not listed.) The control means may be operable to control the lubricant input means to adjust the supply of lubricant to the system of engineering components, based on signals from the calibration means.

The control means may comprise a computing means, which may include analogue to digital signal conversion means and/or digital to analogue signal conversion means. The control means may utilise an algorithm based on lubricant thickness signals to control the lubricant input means. The algorithm may also utilise signals relating to engine load, ambient oil sump temperature and/or temperature of one or more points within the engine to control the lubricant input means. Said signal(s) may be supplied to the control means.

The measurement means may include a displacement transducer for determining the relative distance between the transducer and a target, which may be a piston skirt or a piston-ring, the position of which target may relate to, or preferably defines, the thickness of lubricant between the target and the transducer. The transducer may be located in the cylinder wall. The target may be located in a skirt of the piston, or in a piston-ring, but will normally be the components themselves.

The measurement means may, alternatively, involve determining the displacement between two sliding components by direct assessment of a physical variable in which the components themselves may serve as elements of the transducer.

The oil film thickness transducer may use one or more of capacitative, inductive, optical, resistive, impedance methods, radioactive means and acoustic (ultrasonic) means of determining the lubricant thickness.

Other transducers may be incorporated in the system to record parameters of secondary importance such as target position, temperature, oil viscosity, optical and electrical constants.

The measurement means may include a plurality of spaced transducers for determining lubricant thickness at spaced locations in the system of engineering components. The locations may be axially and/or radially spaced around the system. Each transducer may provide its own lubricant thickness measurement.

The measurement means may be indirect measurement means operable to measure the thickness of lubricant on an element of the system of engineering components by indirect means. The indirect measurement means may measure one or more variables related to the thickness of lubricant on the element. The or each variable may be dependent on the thickness of lubricant, preferably for a given set of running conditions of the system. The control system may be operable to relate the or each variable to lubricant thickness by means of predetermined relationships between the or each variable and the oil film thickness, preferably determined by empirical means.

The lubricant input means may be operable to input lubricant into the system of engineering components at a location specified by the control means. The location may be determined by a measurement of lubricant thickness.

The lubricant input means may be operable to vary the amount of lubricant input into the system. The lubricant input means may be operable to input lubricant at substantially the same locations of each of a plurality of transducers.

The lubricant input means may be operable to input lubricant at specific locations in the system of engineering components depending on the output of specific transducers.

The system of engineering components may be an internal combustion engine. In which case the thickness of lubricant on a specific point on a cylinder may be measured (or it may be an average value or other indicative parameter such as a maximum and/or minimum value.)

The thickness of lubricant may be a thickness between a piston-ring and a cylinder liner and/or between a piston skirt and a cylinder liner or both.

The lubricant film thickness measurement means may be operable to measure the thickness of lubricant on a cylinder wall of the engine.

The engine may be a marine diesel engine, a large stationary engine, an engine having a long duty cycle, such as a locomotive engine, or a motor sports engine or any other internal combustion engine, including Wankel engines and other types of internal combustion engine.

The invention extends to an internal combustion engine comprising a lubrication control system as described in relation to the above aspect.

According to another aspect of the present invention a method of controlling the distribution of lubricant in a system of engineering components comprises measuring the thickness of lubricant on an element of the system with lubricant film thickness measuring means, passing a signal corresponding to that measurement to control means, determining an amount of lubricant to be supplied to one or more components of the system with the control means, based on the thickness measurement and sending control signals to lubricant input means to control a supply of lubricant to the system.

Multiple input locations and thickness measurement locations may be provided for, which two sets of locations may be substantially the same.

The method may include adjusting the input of lubricant to a part of the system based on a thickness measurement from that part of the system.

Figure 2:
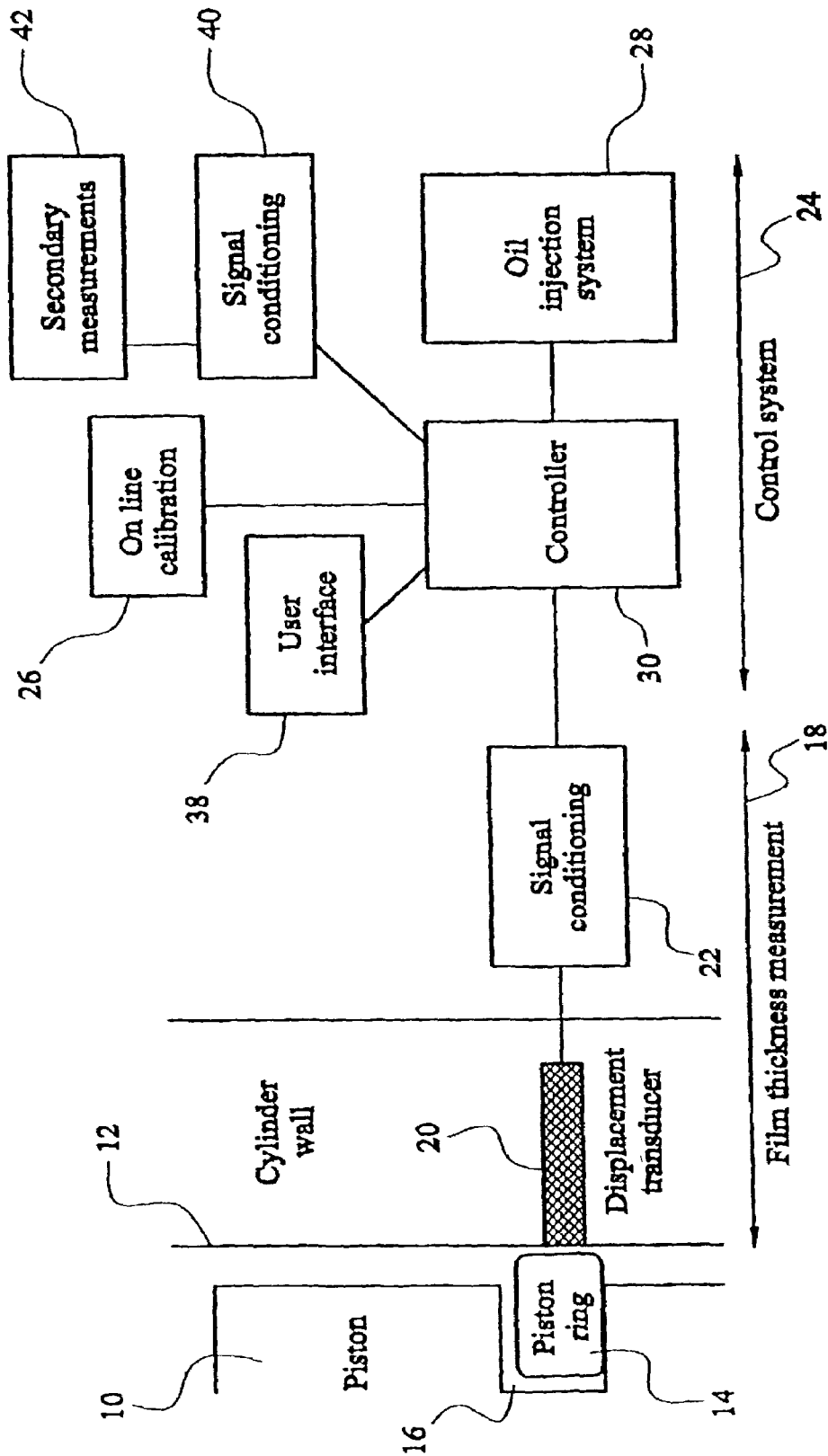

All of the features described herein may be combined with any of the above aspects, in any combination Specific embodiments of the present invention will now be described, by way of example, and with reference to the accompanying drawing, in which:

FIG. 1 is a schematic diagram of a general layout for an oil supply control system; and FIG. 2 is a schematic diagram of the components of an embodiment of oil supply control system for an internal combustion engine.

In FIG. 2, a portion of a cross-section through a piston 10 and cylinder wall 12 of an internal combustion engine are shown. A piston-ring 14 is located in a ring groove 16 in the piston 10. The piston-ring 14 is part of an oil film thickness measurement section 18, the other parts of which comprise a displacement transducer 20 and an electrical signal conditioning unit 22. The oil supply control system also includes a control system section 24, which comprises an on line calibration section 26, an oil injection system 28 and a controller 30. The cross-section would apply to a section through a piston skirt as it does to a piston-ring. Also, a user interface 38 and a secondary signal conditioning unit 40 receiving secondary measurement signals from a unit 42 or several units 42 are included.

The oil film thickness measurement section 18 can comprise a number of different types of oil film thickness measurement equipment. The different methods of measuring oil film thickness include capacitative measurement, inductive measurement, impedance based measurement, resistive measurement, optical measurement, acoustic (ultrasonic) and radioactive type measurement.

For each of these different types of measurement method, the displacement transducer 20 and signal conditioning unit 22 may have different characteristics, but their function would be the same.

Several types of transducer can be used to measure the thickness of oil film between the pistons and cylinder walls. Some equipment is available commercially, but many systems only exist as specialist measurement equipment in Universities and test and development organisations. Typically, the thickness of the oil film between the piston 10 and the cylinder wall 12 will be of the order of a few micrometers in the centre of the stroke of the piston. Towards the ends of the stroke where the piston moves more slowly, the film is thinner and the piston and/or piston-rings may make contact with the cylinder wall. Given that this gap is very small and that the operating conditions in this part of an internal combustion engine are fairly hostile, i.e. there is vibration, high pressure and high temperature; a transducer of highly robust design is required to measure oil film thickness measurement in this application. At present, it is believed that the most reliable systems will be based on capacitative or inductive principles.

Measurement sensors may be located in a variety of locations. Some examples are:
- in the cylinder liner where they directly detect the distance to the target component, e.g. the skirt or ring;
- locations behind the piston-ring, where the thickness of the oil film is inferred by detecting the movement of the back face of the ring;
- positions which allow the width of the ring gap to be measured, thereby collecting data which allows changes in the operating oil film thickness to be deduced from indirect measurements.

Measurement of the displacement between components may also be made by means in which the components themselves serve as elements of a transducer. For example, average film thickness between a shaft and a bearing can be evaluated by measurement of the total electrical capacitance (or resistance or impedance) between these two components.

In order to measure the oil film thickness using capacitive, inductive or impedance methods, a moderately specialised version of relatively common equipment is used. Normally, the measurement system includes a signal conditioner 20, as well as a high frequency signal generator or oscillator (not shown). The signal from the oscillator is used to excite the transducer 20 where physical effects associated with the film thickness give rise to modulations in the signal from the oscillator. (However, other physical effects may be employed to measure the clearance between the transducer and the target).

In a capacitative system, changes in the film thickness effectively change the spacing of a miniature parallel plate capacitor, thereby altering its charge. This capacitor 20 is connected to a charge amplifier (signal conditioner 22) which produces a voltage proportional to the spacing between the transducer 20 and the piston-ring 14. Usually the signal conditioning means involves amplification and demodulation to obtain a dynamic signal which reflects the spacing between the piston-ring 14 and the displacement transducer 20. The distance from the ring to the liner indicates the thickness of the oil film 32 between the piston-ring 14 and the displacement transducer 20. In order to achieve this, the piston-ring 14 is biased to extend towards the cylinder wall 12 in the absence of oil 32.

Capacitance based systems must be calibrated in a manner which takes account of the permittivity of dielectric in the gap between the target and the transducer. If the medium in the gap changes, the system must be re-calibrated. This effect must, therefore, be accounted for in oil changes. (However, it is a characteristic which makes capacitative systems particularly helpful when conducting measurements to detect the location of inlet and outlet oil film boundaries around piston-rings, e.g. to observe the likelihood of blow-by or cavitation effects.)

An example of a capacitance based oil film thickness measurement system is described in:

Grice, N., Sherrington, I., Smith, E. H., O'Donnell, S. G., Stringfellow, J. F. "*A capacitance based system for high resolution measurement of lubricant film thickness*". Proc. of Nordtrib '90. 4$^{th}$ Nordic symposium on Tribology, Lubrication, friction and wear. (Hirtsals, Denmark) 1990, p 349-361.

Systems which measure oil film thickness using inductance may employ sensors based on a mutual inductance or self inductance principles. Miniature inductance sensors are calibrated to the target material to measure the range to a ring, skirt or target. Their operation is different to that of capacitance transducers as their output will not generally be influenced if the type of oil which fills the gap between the transducer and ring is altered. (However, changes in the magnetic properties of the oil may arise as a consequence of the accumulation of wear particles in the oil.) Examples of inductive measurement systems have been described by:

Dow, T. A., Schiele, C. A. and Stockwell, R. D., "*Technique for experimental evaluation of piston-ring/cylinder film thickness.*" J. Lubr. Technol. 105 (1983) pp 353-360;

Wing, R. D. and Saunders, O. "*oil-film temperature and thickness measurements on the piston-rings of a diesel engine.*" Proc. I. Mech. E. 186(1) (1972) pp 1-9.

In a resistive type oil film thickness measurement system two related approaches may be adopted to determine the thickness of an oil film. The approach requires that at least some engine components are electrically insulated from the rest of the engine. In a first approach, the resistance of all or part of the oil filled gap between the cylinder wall and the piston-ring is measured (usually with some kind of bridge circuit,) and a change in resistance reflects a change in the oil film thickness. In a second approach, the degree of electrical breakdown (or isolated contact) between the isolated components/electrodes can be measured. In this example less breakdown, measured on the basis of a number of individual contacts, or the duration of contact time, reflects a bigger gap. In both of these cases an output signal results which can be related to oil film thickness. However, it should be noted that the resistance measurements of oil film thickness are generally regarded as not being particularly reliable. Previous examples of resistive measurement systems are described in:

Courtney-Pratt, J. S., Tudor, G. K. "*An analysis of the lubrication between the piston-rings and cylinder wall of a running engine*". Proc. I. Mech. E., 155 (1946 pp 293-299;

Furuhama, S., Sumi, T. "*A dynamic theory of piston-ring lubrication* (3$^{rd}$ *report, measurement of oil thickness.*)" Bull JSME 4 (16) (1961) p 744-752.

Optical systems for measuring oil film thickness are rapidly developing. Two approaches have so far been adopted, as described below.

The first approach is an interference method. This uses a system to illuminate the contact between the subsidiary piston 14 and the displacement transducer 20 with monochromatic light. Interactions between light reflected from different boundaries within the contact generates interference patterns in the lubricating film. By analysis of the interference pattern, the thickness of the film at different parts of the contact can be deduced. A previous example of this type of system can be found in:

Wakuri, Y., Ono, S., Soejima, M., Noguchi, N. "*Oil film behaviour of reciprocating slider with circular profile. (Observation of oil film by means of thin film interferometry.*)". Bull JSME, 22(167) (1979) pp 755-762.

Chromatic illumination may also be employed for the purpose of generating interference patterns in the lubricating film.

The second approach to using an optical system uses fluorescence methods. In this approach, laser light is directed into the lubricated contact between the piston-ring 14 and the displacement transducer 20, using a conventional optical system and a quartz window, in the cylinder wall 12 for example. Alternatively, an optical fibre can be used to direct the light to a location on the cylinder wall 12 where the oil film thickness is to be measured. Light incident on the lubricating film causes fluorescence of the oil. (It is common now to add a dye to enhance this effect.) A suitable optical system, which may be a conventional optical system or one based on optical fibre technology, can be used to direct light out of the oil film in order to observe the intensity of the fluorescence effect, which is dependent on the oil film thickness. Normally, the detector will be a charge coupled device or an optical detector with an appropriate specification to measure the intensity of the fluorescence at specific wavelengths. The use of optical filters is necessary to select the wavelength of light relevant to the oil film thickness observation. The method is known for being difficult to calibrate, but this problem is gradually being overcome by the adoption of a range of ingenious approaches for assessing the fluorescence effect. Examples of previous use of fluorescence methods can be found in:

Inagaki, H., Saito, A., Murakami, M., Konomi, T., "*Development of two-dimensional oil film thickness distribution measuring system*", SAE paper 952346;

Sanda, S., Konami, T. "*Development of a scanning laser-induced fluorescence method for analysing piston oil film behaviour*". Pub I. Mech. E. Paper 465/014/93 (1993) pp155-164.

Other potential methods for measuring the thickness of oil films include radioactive thin film activation and acoustic monitoring. At the present, however, these methods are generally regarded as impractical as a proposition for use outside a laboratory.

The control system section 24 can be based on a controller 30 which has a number of different forms. These include a dedicated analogue electronics system, a dedicated digital electronics system, a hybrid of digital and electronic technology, or a computer with analogue to digital conversion and digital to analogue conversion capability.

In practice, a computer with analogue to digital conversion and digital to analogue conversation capability is likely to be the most sensible choice.

The controller 30 includes control software for processing the oil film thickness data from the film thickness measurement section 18. The controller 30 then produces a control signal to control the oil injection system 28, which injects oil into the engine's cylinders. The controller 30 may also receive measurements of other physical variables to provide a more accurate and effective control signal to the oil injection system 28. These physical variables include engine load, ambient oil sump temperature and temperature at various points within the engine.

The controller 30 utilises an algorithm with which it determines the amount of oil 32 to be injected into the cylinder by the oil injection system 28 and also the timing and quantity of that injection based on the oil film thickness measurement and the other ambient physical variables mentioned above. In simple terms, if the oil film thickness requires adjustment to optimise some aspect of engine performance, then the amount of oil injected into the cylinder will be changed.

Oil Assessment

The on-line calibration section 26 includes calibration cells, which contain samples of a small amount of the oil that is being injected into the engine. These are incorporated into the system to measure the oil constants of relevance to the measurement section 18 and are used to continuously, or intermittently to self-calibrate the measurement section 18 and the control system section 24. For example, a capacitance based measurement system would require the on-line calibration section 26 to measure the dielectric constant of the oil.

Furthermore, viscosity data for the oil 32 are required for all types of systems. The viscosity data could be acquired by typing data in to storage means of the controller 30 from a specification sheet, using a look up table of manufacturers data or employing an automatic, on line viscosity measurement system.

Complete continuous self calibration is an advantageous option because employing this approach means that the oil control system 24 would be able to adapt to the characteristics of different oils used to lubricate the engine and the influence of changes in ambient operating conditions automatically. The devices contained in the cells for making the measurements will depend on the principle of measurement adopted for the control system.

Data from the calibration cell may also be useful in evaluating the suitability of the oil for continued use. However, such an assessment may require the use of additional transducers in other cells 27, 42 able to measure other parameters that reflect the condition of the oil more effectively. This may involve, for example, measuring the quantity and size distribution of wear debris particles in the oil. (e.g., to assess the ability of debris to promote further wear), measuring the alkalinity/acidity of the lubricant (e.g. to evaluate its tendency to resist/promote corrosion), assessment of other special variables such as the concentration of special performance enhancing additives (e.g., extreme pressure additives).

This data may be evaluated using oil flowing in the oil circuit, the oil sump or oil deliberately sampled from critical locations within the system. E.g., surface contacts, or other locations near to contacts where it is known that extreme conditions may have stretched the performance of the lubricant. (i.e., oil sampling may be employed.)

The system which continuously assesses the state of the oil could also, if required, be used in the control of apparatus able to dynamically adjust detailed properties of the oil if required. This will be achieved by use of valves and reservoirs which contain oil additives. Opening the valves will admit additives into the oil circuit and change the balance of the additive package in the circulating oil. These additives could be supplied to the normal lubricant reservoir or directly to specific locations within the lubricated system to meet the demand of changing operating conditions in the systems or oil deterioration.

The oil assessment system may also incorporate established (i.e. commercially available) equipment for on-line condition monitoring of machines/mechanisms 26. These systems are able, for example, able to monitor the wear debris in the lubricant to identify which components in a machine may be suffering wear or may be about to fail.

These systems may also be able to identify the type of process leading to the wear and details of the rate at which it occurs.

The various embodiments of the oil injection control system described herein have a wide variety of advantages in comparison to existing oil injection control systems. For example, several oil film thickness measurement transducers could be incorporated into each cylinder, spaced radially and axially around each cylinder to give a comprehensive picture of the operating oil film at different points in the stroke around the circumference of each piston-ring. In this situation, the oil film thickness measurement section 18 may include many channels of signals per cylinder. This measured data will be used by the control system section 24 to determine the quantity of oil to be injected into each engine cylinder. The quantity of oil injected may, therefore, be different radial points around a given cylinder and be different for each cylinder to reflect the precise needs of a given piston-ring at different circumferential locations.

In addition to the specific use described above in relation to FIG. 2, the system has many applications, examples of which are given below. In FIG. 1, the generalised system has the same reference numerals for the corresponding parts as those that also appear in FIG. 2.

In the generalised system the displacement transducer 20 is located in a wall section of one of the interface components 34, 36. Also, the system may additionally comprise an oil condition assessment portion 27, a data recording portion 37 and a machine condition monitoring section 41.

The oil supply control system has potential application in the control of oil films for a wide range of aerostatically, hydrostatically, hydrodynamically and elastohydrodynamically lubricated components. Examples include:

piston-rings and skirts in internal combustion engines;
hydrodynamic journal bearings;
hydrodynamic tilted pad bearings;
hydrostatic bearings;
aerostatic bearings;
rolling element bearings;
gear contacts;
traction contacts;
cams and followers.

The fundamental elements of the control system are illustrated in FIG. 1.

Possible advantages conferred by using the system to control the supply of oil to hydrodynamic journal bearings and tilted pad bearings include the following.

a) The oil flow rate can be adjusted to obtain a given oil film thickness during the operation of hydrodynamic journal bearings and tilted pad bearings and offer the opportunity to dynamically adjust the film thickness to account for changes of speed, load, inlet oil viscosity, etc., during operation. This will permit:

oil flow rates to be changed at start/stop of the moving component to minimise wear;

oil flow rates to the bearing to be adjusted to optimise for a range of operator requirements. For example, the oil flow rate could be adjusted to a given set of operating conditions to conserve pump energy usage;

oil flow rates to be adjusted to maintain oil film thickness during anticipated changes of load or speed. E.g. it will be possible to stiffen or cushion a contact in a bearing which only occasionally experiences dynamic loads.

b) If wear of one or both of the bearing components does occur, changes in clearance or shape which may normally necessitate a replacement of the bearing, or a manual change to the oil supply system can be, to some extent, automatically compensated for by the oil supply control system.

c) Changes in the type of lubricant used, or changes in its characteristics during operation (e.g. changes in viscosity due to changes in speed or load of the ambient temperature of the oil sump) will influence the operating film thickness. Using the control system it would be possible to compensate for some of these effects by changes in the oil supply rate, thus maintaining a complete film or, alternatively, a "safe" operating film thickness for the bearing.

d) The thickness of the operating oil film can be continuously monitored and logged by a recording system (e.g. a Personal Computer). Operating conditions which lead to contact between the bearing components can be recognised by the system and the operator alerted if the condition is sufficiently serious to demand notification. (Recognising that some level of overload may be acceptable). Details of the overload conditions and their duration could also be recorded by the system.

e) As the energy absorbed at the bearing depends on the operating film thickness to some extent, there will be some limited opportunity to control the amount of energy required to operate the contact.

f) It will be possible to incorporate into the system active temperature control (probably cooling) of the oil supplied to the bearing. Reducing the temperature of the oil supplied at the inlet (probably achieved by cooling the oil sump) would permit further extension of control scheme allowing bearings to operate in a wider range of conditions while maintaining a "safe" (minimum wear) operating film thickness. In principle, it is also possible to control the operation of a group of possible alternative oil supply sumps. These sumps could be filled with oils designed for operation under a range of different conditions to suit prevailing ambient and operational situations. (E.g. they could be filled with oil of differing viscosity.) The oil control system would be able to switch oil from alternative sumps to meet differing demands.

g) It will be possible to apply some control of the operating oil film thickness at crucial stages in the lifetime of the operation of the bearing, e.g. to control the running-in phase by supplying sufficient lubricant to limit asperity interaction and consequently to limit wear.

Hydrostatic Bearings/Aerostatic Bearings

The advantages listed above for hydrodynamic bearings will also be conferred on aerostatic and hydrostatic bearings. However, it is worthwhile emphasising one important aspect of using this control system in the operation of hydrostatic/aerostatic bearings.

Hydrostatic/aerostatic bearings are normally designed to accommodate a maximum load based on the pressure of the lubricant supply and other (largely geometrical) design characteristics of the components. The control system outlined in this patent provides a feedback loop which is able to control the characteristics of the lubricant supply: temperature, pressure, etc. Varying these characteristics would permit a hydrostatic/aerostatic bearing to accommodate a change of load or speed and maintain a satisfactory operating film thickness for the bearing components under a wide range of operating conditions. This would confer several advantages, for example; the bearing could be allowed to operate under a wide range of loads while permitting the lubricant supply system (e.g. pump) to operate more efficiently, i.e., only working to maintain a pressure and flow rate sufficient to maintain a lubricant film thickness to support a prevailing load rather than a maximum predicted load for a given application.

Rolling Element Bearings/Gear Contacts/Traction Contacts/Cams and Followers

The above engineering components normally operate in the elastohydrodynamic (EHD) regime with a comparatively thin operating film. Commonly, the quantity of lubricant required to maintain their correct operation is quite small and will be carried in to the contact on the surface of the components through many contact events. However, at some time lubricant replenishment will be required and consequently a lubricant supply control system can have a vital role to play in maintaining the integrity of contact surfaces of partially rolling contacts such as gears, continuously variable transmissions (CVTs), infinitely variable transmissions (IVTs) and other components lubricated by EHD.

In EHD contacts components are normally non-conformal and commonly operate in a mixture of slip and rolling. The stress at these contacts is very high and they frequently fail by fatigue. One of the principal functions of the lubricant is to help delay fatigue failure. The presence of a lubricant leads to two important effects:

the contact pressure profile is smoothed by the presence of a thick film;

the generation of shear stress caused by micro-slip is reduced by the presence of thicker oil films.

The oil supply control system outlined here could play a vital role in maintaining the life of EHD contacts by allowing them to be operated in a manner which ensures that the inlet is always "fully flooded". This condition avoids "inlet starvation" and will serve to help maximise the size of a pressurised contact zone thus spreading the contact load as widely as possible, minimising contact stress and increasing lifetime.

A second useful function for this system may arise in cases where it is necessary to improve heat removal from the contact. Operational conditions which will lead to an "undesirable" rise in temperature resulting in a change in film thickness could to some extent be automatically compensated for by a change in the lubricant supply rate (and/or change in the lubricant supply temperature or lubricant type) to promote heat removal from the contact.

Advantages which may particularly relate to an internal combustion engine and may also apply to a more generalised system are set out below.

The use of a control algorithm which is software based would allow the oil injection system to be controlled in ways hitherto not considered. The system can offer engine operators a range of control options and other advantages as follows.

Oil costs can be reduced by providing only the minimum quantity of oil required to maintain an adequate oil film, commensurate with a given amount of wear.

The wear rates of piston-rings and cylinder liners can be controlled by adjusting the amount of oil used.

The pollution produced by an engine can be controlled by modification of the volume of oil injected, thus providing a trade off against increased wear.

The volume of oil injected into the system can be automatically compensated to accommodate for variations in the quality and type of lubricating oil supplied to the ship.

The system provides an improved ability for accelerating the engine when required by optimising the operating oil film thickness to reduce friction before the engine is accelerated.

The system allows lubricating conditions to be controlled in a manner which is unique to each individual cylinder of an engine. This should extend the service period for the cylinder/engine, for example by extending the period between change of piston-rings. Such closely controlled operating conditions may also extend useful engine life in general.

The sealing of a piston-ring in the cylinder could also be improved over the engine life. The effect of changes in the clearance of engine components due, for example, to piston-ring or cylinder liner wear could be taken into account automatically. This procedure can be undertaken on an individual cylinder by cylinder basis. Such a system should allow a reduction in the occurrence of combustion gas escaping past the piston-rings (known as blow-by) and could be particularly useful in temporarily enhancing power output from engines with worn piston-rings/cylinder liners.

The system may allow for the incorporation of condition monitoring. It is envisaged that the oil film thickness measurement system will be sensitive to certain types of problem elsewhere in the engine which could be observed through their influence on the oil supply control system.

The system is able to compensate for changes in the needs of an engine operating at sea which arise when the sea state changes. Sea conditions have been reported to influence the operating film thickness of piston-rings.

The system allows control of the quantity of oil supplied to the engine to account for changes in requirements arising as a consequence of environmental conditions and/or local legislation.

The system accounts for differences in operating conditions in each cylinder which arise as a consequence of the marginal differences in the engineering assembly and manufacture (e.g. tolerances on component sizes and variations in clamping forces) which inevitably arise in an engine and its components. Thus, the performance of each engine cylinder can be optimised.

The system allows the influence of the control variables used by the algorithm to be modified. This permits the engine operator flexible control and potentially provides the opportunity to take advantages of changes in thinking relating to oil film thickness control technology.

Derived Systems

When the performance of contacts between the same components in different machines is highly repeatable, or at least well characterised, it will not be necessary to fit a full feedback system to obtain significant improvements in lubrication control. This situation may occur, for example, where the tolerance in manufacture, construction and fitting of machine components is high and where systems have variable, but known tolerances/clearances on or between parts. (Especially if there is limited wear and/or a specific, limited range of operating conditions predominate.)

In these systems it will be possible to achieve an improved level of reliability in oil film thickness control, along with some of the attendant benefits, by using an oil supply which is controlled by an open loop system which uses control signals based on pre-recorded data which relates oil film thickness and a range of related operating parameters. (E.g., speed, load, oil viscosity, temperature, system geometry, etc.)

This pre-recorded data could be acquired in tests conducted using representative components, machines or engines fitted with a complete feedback system. Such an arrangement will allow the interdependence of film thickness and the related operating parameters to be established. This information can be used to construct "look-up tables", empirical equations, or other forms of basis for control for an open loop system designed to control the oil film thickness of components which have been built to the same design. If contacts in the system under open loop control are not "identical" to the test device, they may be of a nature which allows some scaling of the control signals to compensate for differences between themselves and the components used in the test. (Thus the effect of differences in operating condition, component size, clearance, etc., can be taken into account to avoid testing of some similar, but non-identical, contacts.)

It will also be possible, especially in case of single contacts such as journal bearings and tilted pad bearings, to generate suitable data to control oil film thickness by using theoretical analysis and/or numerical models (probably computer based) of the operation of the components. Although, in practice it is probably sensible to back up such predictions by some testing to confirm the validity of the control algorithms.

These open loop control systems will not generally offer as high a level of control and adaptability as the comprehensively instrumented feedback systems; but, they will offer an improved level of oil supply control appropriate for use in a significant number of machine contacts. These open loop systems may incorporate some, all, or none of the other aspects of the systems discussed above. (E.g., facilities for data recording, oil assessment/machine assessment, etc.)

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extend to any novel one, or any novel combination, of the features disclosed in this specification (including any accompanying claims, abstract and drawings), or to any novel one, or any novel combination, of the steps of any method or process so disclosed.

The invention claimed is:

1. A method of controlling the distribution of lubricant in a system of engineering components comprises:
    measuring the thickness of lubricant on at least one element of the system with lubricant film thickness measuring means,
    passing a signal corresponding to the thickness measurement to control means,
    determining a value of at least one physical variable of the lubricant being of relevance to the lubricant film thickness with calibration means,
    sending the value of the at least one physical variable of the lubricant to the control means,
    calibrating the thickness measurement with the control means based on the value of the at least one physical variable of the lubricant to obtain a calibrated thickness measurement;
    determining an amount of lubricant to be supplied to one or more components of the system with the control means, based on the calibrated thickness measurement, and
    sending control signals to lubricant input means to control a supply of lubricant to the system.

2. A method as claimed in claim 1, which includes adjusting the input of lubricant to a part of the system based on a thickness measurement from that part of the system.

3. A method of controlling the distribution of lubricant in a system of engineering components comprises:
    measuring the thickness of lubricant on at least one element of the system with a lubricant film thickness measurement apparatus,
    passing a signal corresponding to the thickness measurement to a controller,
    determining a value of at least one physical variable of the lubricant being of relevance to the lubricant film thickness with a calibration apparatus,
    sending the value of the at least one physical variable of the lubricant to the controller,
    calibrating the thickness measurement with the controller based on the value of the at least one physical variable of the lubricant to obtain a calibrated thickness measurement;
    determining an amount of lubricant to be supplied to one or more components of the system with the controller, based on the calibrated thickness measurement, and
    sending control signals to lubricant inputs to control a supply of lubricant to the system.

4. A method as claimed in claim 3, which includes adjusting the input of lubricant to a part of the system based on a thickness measurement from that part of the system.

* * * * *